(12) United States Patent
Rider et al.

(10) Patent No.: US 6,674,943 B2
(45) Date of Patent: Jan. 6, 2004

(54) MODIFIED PM TAP COUPLERS

(75) Inventors: Andrew Richard Rider, Torquay (GB); Andrew Robertson, Torquay (GB)

(73) Assignee: JDS Uniphase Corporation, San Jose, CA (US)

(*) Notice: Subject to any disclaimer, the term of this patent is extended or adjusted under 35 U.S.C. 154(b) by 83 days.

(21) Appl. No.: 10/079,288

(22) Filed: Feb. 20, 2002

(65) Prior Publication Data

US 2002/0159704 A1 Oct. 31, 2002

Related U.S. Application Data

(60) Provisional application No. 60/269,356, filed on Feb. 20, 2001.

(51) Int. Cl.[7] .................................................. G02B 6/26
(52) U.S. Cl. ............................. 385/43; 385/11; 385/48
(58) Field of Search .............................. 385/11, 31, 32, 385/43, 48

(56) References Cited

U.S. PATENT DOCUMENTS 5,293,440 A * 3/1994 Miles et al. ................... 385/51
5,987,201 A * 11/1999 Chen ............................. 385/43

FOREIGN PATENT DOCUMENTS

WO    WO 01/23929 A1 * 4/2001 ............ G02B/6/28

* cited by examiner

*Primary Examiner*—Akm Enayet Ullah
*Assistant Examiner*—Michelle R. Connelly-Cushwa
(74) *Attorney, Agent, or Firm*—Allen, Dyer, Doppelt, Milbrath & Gilchrist, P.A.

(57) ABSTRACT

A fused optical coupler has a PM and a non-PM fiber with equal clad diameters. The fibers are plaited together without applying torsional force on either fiber, fused and stretched to a degree resulting in a tap ratio not more than 10% and PER higher than about 20 dB.

11 Claims, 2 Drawing Sheets

MOUNT

STRIP

FUSE

DRAW

MOUNT

MODIFIED PM TAP COUPLERS

RELATED APPLICATIONS

This application claims priority from U.S. Provisional Application No. 60/269,356 filed Feb. 20, 2001.

TECHNICAL FIELD

This invention relates to optical couplers, particularly tap couplers utilizing polarization maintaining (PM) optical fibers, and to a method of manufacturing such couplers.

BACKGROUND OF THE INVENTION

Polarization maintaining fibers (PMF) are characterized in that they retain the polarization of the input signal within them throughout their length. Known PM fibers may be of various types e.g. Panda™ or bow-tie (Tiger) type, varying in the shape of the so-called stress rods, or tensioning members, i.e. regions of different glass composition in the fiber cladding. Also known are PM fibers with an elliptical core shape. All these types of PM fibers are characterized by the presence of two principal polarization axes.

A tap coupler is designed such that the amount of optical energy coupled from one of the fibers into the other is substantially less than the 50% typical of a conventional 3 dB coupler.

Known tap couplers use either standard optical fibers (usually SM fibers) or PM fibers. It is known to produce such couplers by positioning two stripped fibers side-by side and either joining them (e.g. by fusing) in a parallel arrangement or twisting them before fusing. For tapping purposes, only three of the four ports of a coupler are used.

International Application WO 01.23939 published Apr. 5, 2001 discloses a fused optical coupler having a PM fiber and a standard (non-PM) fiber. The cross-section of the non-PM fiber is smaller than the cross section of the PM fiber in the area of fusion of the coupler.

U.S. Pat. No. 5,293,440 describes couplers made from PM fibers, SM fibers, multi-mode fibers (MMF) or their combination.

SUMMARY OF THE INVENTION

Polarization extinction ratio (PER) is an important parameter of a coupler employing a PM fiber. It is usually desired to keep PER at a relatively high level, preferably at least about 20 dB, as stated in the International Application, supra.

It is also desired to provide a coupler using a PM fiber and a non-PM fiber wherein the tap ratio is less than about 10% and preferably about 2% or lower.

It has been found unexpectedly that a tap coupler of the type defined above, with a combination of desired parameters, can be produced without reducing the diameter of one of the fibers of the coupler before the fusing and stretching of the fibers.

In accordance with one aspect of the invention, there is provided a fused optical coupler comprising
- a PM fiber having two principal polarization axes, and
- a standard (non-PM) fiber,
- the PM and non-PM fibers having substantially equal clad diameters, the principal axes of the PM fiber arranged randomly relative to the non-PM fiber,
- the fibers elongated to a degree such that the coupler exhibits a tap ratio less than about 10% and polarization extinction ratio (PER) higher than about 20 dB.

In accordance with another aspect of the invention, there is provided a method for producing a fused coupler, the method comprising:
- providing a PM fiber and a non-PM fiber, the two fibers having a substantially equal clad diameter,
- plaiting the two fibers together substantially without applying torsional force on either fiber with random orientation of the principal polarization axes of the PM fiber relative to the non-PM fiber,
- tapering (stretching) and fusing the fibers together to a degree such that the tap ratio of the coupler is not more than about 10% and the PER of the coupler is at least about 20 dB.

The plaiting may be imparted on both of the fibers, whereby both fibers undergo bending, still substantially avoiding torsional force on either fiber. The plaiting results in a number, preferably from 2 to 10, more preferably 3–6, of so-called cross-overs of the fibers.

In one embodiment of the invention, the coupler is adapted to inputting optical energy into the PM fiber and tapping part of the energy into the non-PM fiber.

BRIEF DESCRIPTION OF THE DRAWINGS

Further features and advantages of the present invention will become apparent from the following detailed description taken in conjunction with the appended drawings in which.

It will be noted that throughout the appended drawings, like features are identified by like reference numerals.

DETAILED DESCRIPTION OF THE PREFERRED EMBODIMENT

Figure 1:
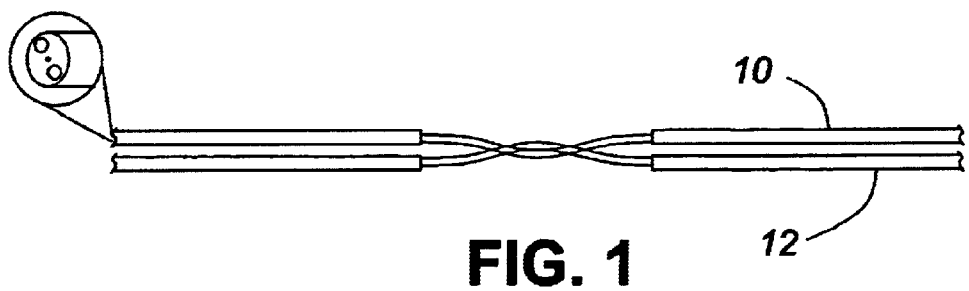
FIG. 1 is a schematic simplified representation of a PM/non-PM coupler of the invention using a "Panda™ type PM fiber without showing the reduced dimension of the fused region.

Referring now to FIG. 1, an exemplary coupler of the invention has a stripped Panda™ PM fiber 10 and a stripped standard single-mode fiber 12, the clad diameter of both fibers (core and cladding) being 125 $\mu$m. The orientation of the principal axes 17 and 19 of the PM fiber 10 is random as shown by way of example in FIG. 3. The coupler has 4 twists (cross-overs) produced by plaiting both fibers around each other without twisting either fiber around its respective longitudinal axis.

The number of cross-overs is selected to achieve a relatively good stability and intimate contact of the two fibers during the fusion process.

In a specific example, the coupler was produced with the following parameters:

| | |
|---|---|
| Fusion Temperature | 1600–1650° C. |
| Draw Temperature | ~4400° C. |
| Taper Aspect Ratio | 1.40–1.70 |
| Draw Tension | ~1–2 gms |
| Taper Elongation | 16–22 mm |

Figure 2A:
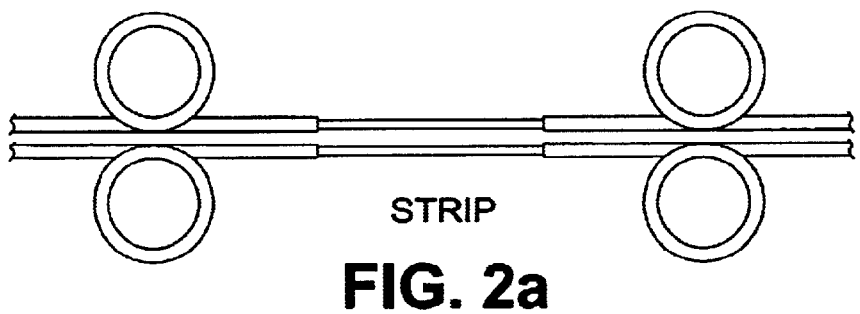
FIGS. 2a–2d show schematically the manufacturing stages of the coupler; and coupler.
Figure 2B:
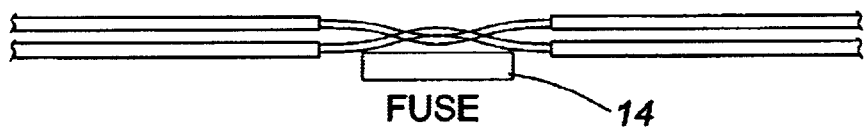
Figure 2C:
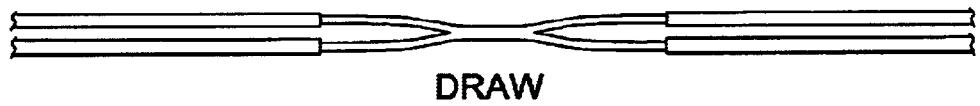
Figure 2D:
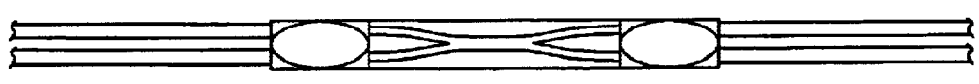
Figure 3A:
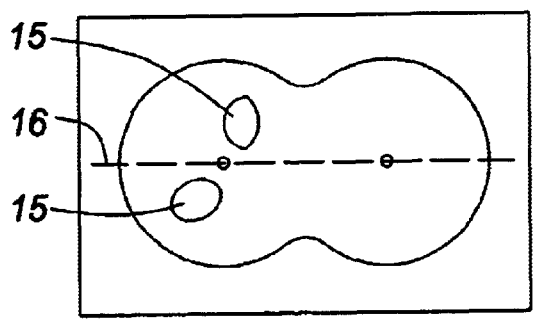
FIGS. 3a–3h illustrate various positions of the stress rods of the PM fiber in the coupler.
Figure 3B:
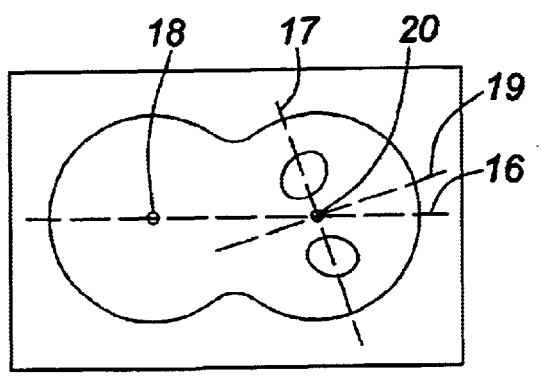
Figure 3C:
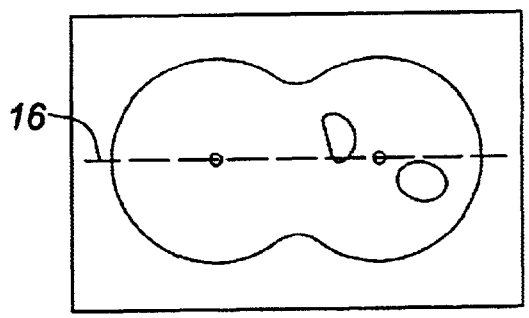
Figure 3D:
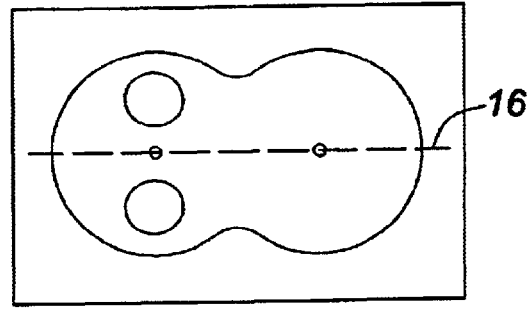
Figure 3E:
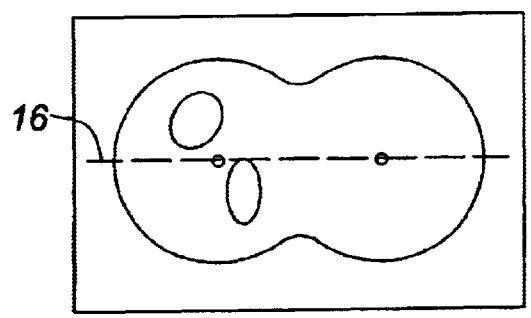
Figure 3F:
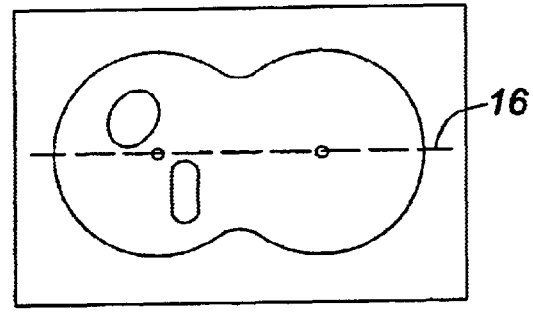
Figure 3G:
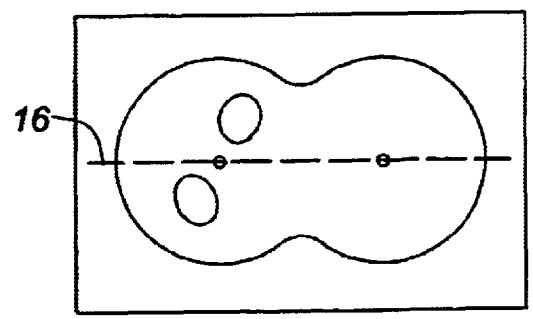
Figure 3H:
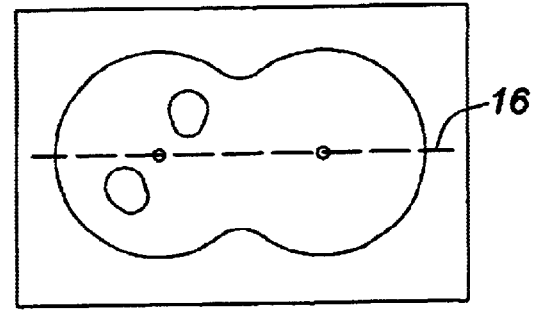

The fabrication process for a fused fiber branching component is shown in FIGS. 2a–2d. The two (or possibly more)

fibers are stripped of their insulation (FIG. 2a), plaited and fused using a heat source 14 (FIG. 2b), drawn to a desired elongation (FIG. 2c) and the resulting coupler is mounted on a substrate (FIG. 2d). Through precise control of the fusion process, the optical properties of the fused region can be varied such that a percentage of light input to one fiber (usually the PM fiber) can be transferred to the other fiber in a loss-less manner. That is, the power output is split between the two fibers.

As evidenced by the actual test results, below, the coupler had a desirable combination of the tap ratio and the polarization extinction ratio.

Resources (Equipment/Location)
- Fusion rig—Pilot Line
- 1465 nm PM diode
- Fujikura PANDA fiber
- Extinction Ratio Meter
- Low gain detectors (−15 dB)

Procedures

Specification

PM+SM Tap

| | Port Configuration: |
|---|---|
| Input-PM Signal-PM | Tap-HI(CS)980 |
| Tap Insertion Loss | 20 ± 3 dB |
| Tap I/Loss Temp. Variation | <0.50 dB (typ 0.30 dB) |
| Insertion Loss-Signal | <0.50 dB (typ 0.3 dB) |
| Excess Loss | <0.20 dB |
| Extinction Ratio-Signal | >20 dB |
| Operating Bandwidth | 1465 ± 3.0 nm |
| Operating Temp | 0–70° C. |
| Storage Temp | −40–75° C. |
| Fiber Type-Input + Signal-Tap | SM.15-P-8/125-UV/UV-400 (1310 nm cutoff) Corning HI(CS)980 |
| Housing: | Ø3.0 × 55 mm |
| Pigtail Lengths: | ≧0.75 m |

| | Manufacturing Instructions |
|---|---|
| Fusion Rig set-up: | 2 × 18 g (9 mm spacing) |
| Butanone Temp: | 12° C. |
| Auto-Sequences: | Drawing-EVT Dynamic Traverse (2000\0–5 mm\1.0) |
| Draw Tension: | 1–2 gms |
| Fusion A/R: | 1.40–1.70 |
| Extension: | 16–22 mm |
| Potting Tension: | 25 gms |
| Cure Schedule: | 20 secs (2 × 10 secs) |
| Stripped Length: | 30 mm (+5 mm For termination tap fiber) |
| Twist arrangement: | 4 plaits CS980 set up at rear. The first plait must be very carefully positioned at the buffer shoulder on the left side. |
| Pigtail Lengths: | Input: 2 m  Signal Output: 1.5 m  Tap Output: 1.5 m |
| Re-warming: | Re-warm in static central position. Let loss rise to 0.3 dB–0.5 dB and tension drop by 8 gms max. |
| Monitor λ: | 1465 nm PM diode |
| Launch PER: | >20 dB |

The term "random orientation of the principal polarization axes" should be clarified. The coupling between the two fibers is dependent to some degree on the orientation of the stress rods 15. It is preferable if the stress rods 15, defining one of the principal polarization axes 17, do not lie exactly in the axis 16 defined by the cores 18 and 20 of the two fibers 10 and 12. Still, adequate couplers were produced according to the invention even if the stress rods 15 lay on the core-to-core axis 16 (small yield implication). For instance if the stress rods 15 partially 'obstruct' the path between the two cores 18 and 20, coupling is affected to a degree but the desired performance can still be attained at the expense of greater elongation compared to when the stress rods 15 are totally clear of the core-to-core axis 16.

Noteworthy is the low excess loss of the coupler of the invention, less than 0.2 dB, typically less than 0.1 dB.

FIGS. 3a–3h show examples of the stress rod orientation for the coupler of the invention. As can be seen, the stress rods 15 can become deformed when close to the core-to-core axis 16 but the optical performance stated is still met.

We claim:

1. A method for producing a fused coupler, the method comprising:

providing a PM fiber and a non-PM fiber, the two fibers having a substantially equal clad diameter, plaiting the two fibers together substantially without applying torsional force on either fiber, with random orientation of the principal polarization axes of the PM fiber relative to the non-PM fiber, and then tapering and fusing the fibers together to a degree such that the tap ratio of the coupler is not more than about 10% and the PER of the coupler is at least about 20 dB.

2. The method of claim 1 wherein the fibers after plaiting define 2–10 cross-overs.

3. The method of claim 1 wherein the excess loss is less than about 0.2 dB.

4. The method of claim 1 wherein none of the fibers undergoes a reduction of its diameter before plaiting.

5. A fused optical coupler comprising:

a PM fiber having a core and two principal polarization axes, and a non-PM fiber having a core, the PM and non-PM fibers having substantially equal clad diameters, the principal axes of the PM fiber arranged randomly relative to the non-PM fiber, the fibers elongated to a degree such that the coupler exhibits a tap ratio less than about 10% and polarization extinction ratio (PER) higher than about 20 dB.

6. The coupler of claim 5 defining 2–10 cross-overs.

7. The coupler of claim 5 defining 3–6 cross-overs.

8. The coupler of claim 5 wherein the clad diameter of both fibers is about 125 μm.

9. The coupler of claim 5 wherein one of the principal axes is defined by stress rods and the stress rods are disposed clear of a core-to-core axis of the two fibers.

10. The coupler of claim 5 having excess loss lower than about 0.2 dB.

11. The coupler of claim 10 having excess loss lower than about 0.1 dB.

* * * * *